United States Patent [19]

Matoba

[11] Patent Number: 5,552,689
[45] Date of Patent: Sep. 3, 1996

[54] SERVO MOTOR

[75] Inventor: Yasuhiko Matoba, Osaka, Japan

[73] Assignee: Laurel Bank Machines Co., Ltd., Tokyo, Japan

[21] Appl. No.: 364,827

[22] Filed: Dec. 27, 1994

[30] Foreign Application Priority Data

Dec. 28, 1993 [JP] Japan .................................. 5-334224

[51] Int. Cl.[6] .................................................. G05F 1/247
[52] U.S. Cl. .......................... 318/599; 318/603; 318/601; 318/567
[58] Field of Search ..................... 318/138, 245, 318/254, 599, 600–632; 388/800–811, 812, 813

[56] References Cited

U.S. PATENT DOCUMENTS

| | | |
|---|---|---|
| 4,194,144 | 3/1980 | Reynolds . |
| 4,227,150 | 10/1980 | Widl .......................... 324/175 |
| 4,297,009 | 10/1981 | Mezrich et al. .................... 352/86 |
| 4,339,700 | 7/1982 | Desbiens et al. ..................... 318/660 |
| 4,354,146 | 10/1982 | Tenmyo et al. . |
| 4,398,137 | 8/1983 | Janicki et al. ..................... 318/601 |
| 4,415,844 | 11/1983 | Mendenhall et al. .................... 318/254 |
| 4,485,337 | 11/1984 | Sandusky ............................. 318/314 |
| 4,575,667 | 3/1986 | Kurakake . |
| 4,638,225 | 1/1987 | Morinaga et al. . |
| 4,748,555 | 5/1988 | Miyake et al. ....................... 318/567 |
| 4,777,418 | 10/1988 | Furue ..................................... 318/603 |
| 4,897,778 | 1/1990 | Miyamoto et al. ....................... 318/599 |

*Primary Examiner*—Paul Ip
*Attorney, Agent, or Firm*—Cushman, Darby & Cushman

[57] ABSTRACT

A servo motor includes a motor, a motor driver for driving the motor by outputting pulses to the motor, and a speed detector for calculating speed information. The servo motor further includes a comparator for comparing the speed information with command speed information and calculating deviation information therebetween, a memory for storing pulse correction information for modifying a duty factor of the pulses in accordance with a rotational state of the motor, and a pulse updater for reading the pulse correction information stored in the memory based on the deviation information, modifying the duty factor of the pulses, and outputting the duty factor modified pulses to the motor driver.

11 Claims, 6 Drawing Sheets

FIG. 3A

| DEVIATION INFORMATION | -60 | -20 | -10 | 0 | +10 | +20 | +60 |  |  |
|---|---|---|---|---|---|---|---|---|---|
| SET SPEED1 | +5 | +2 | +1 | 0 | -1 | -2 | -5 ← 200 | | ⋮ |
| SET SPEED2 | +7 | +4 | +2 | 0 | -2 | -4 | -7 ← 200 | | ⋮ |
| SET SPEED3 | ⋮ | ⋮ | ⋮ | ⋮ | ⋮ | ⋮ | ⋮ | ⋯ | ⋮ |
| ⋯ | | | | | | | | | |
| SET SPEEDn | | | | | | | | | ⋮ |

SET SPEED

FIG. 3B

| SET SPEED | ON-DUTY | OFF-DUTY | CYCLE | SAMPLE | INTERVAL |
|---|---|---|---|---|---|
| SET SPEED1 | 6(ms) | 4(ms) | 10(ms) | 10(ms) | 10(ms) |
| SET SPEED2 | 6(ms) | 9(ms) | 15(ms) | 15(ms) | 15(ms) |
| SET SPEED3 | ... | ... | ... | ... | ... |
| ... | | | | | |
| SET SPEEDn | ... | ... | ... | ... | ... |

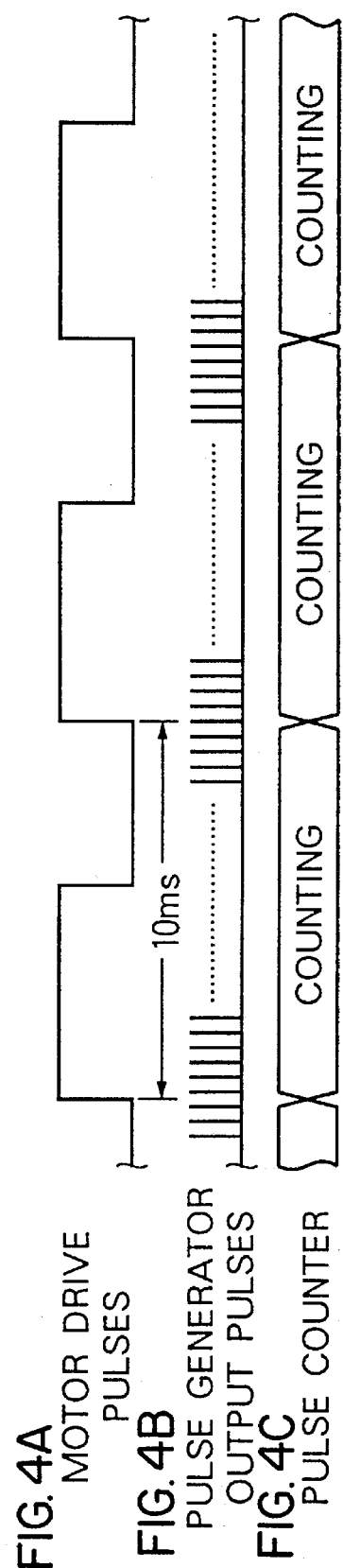

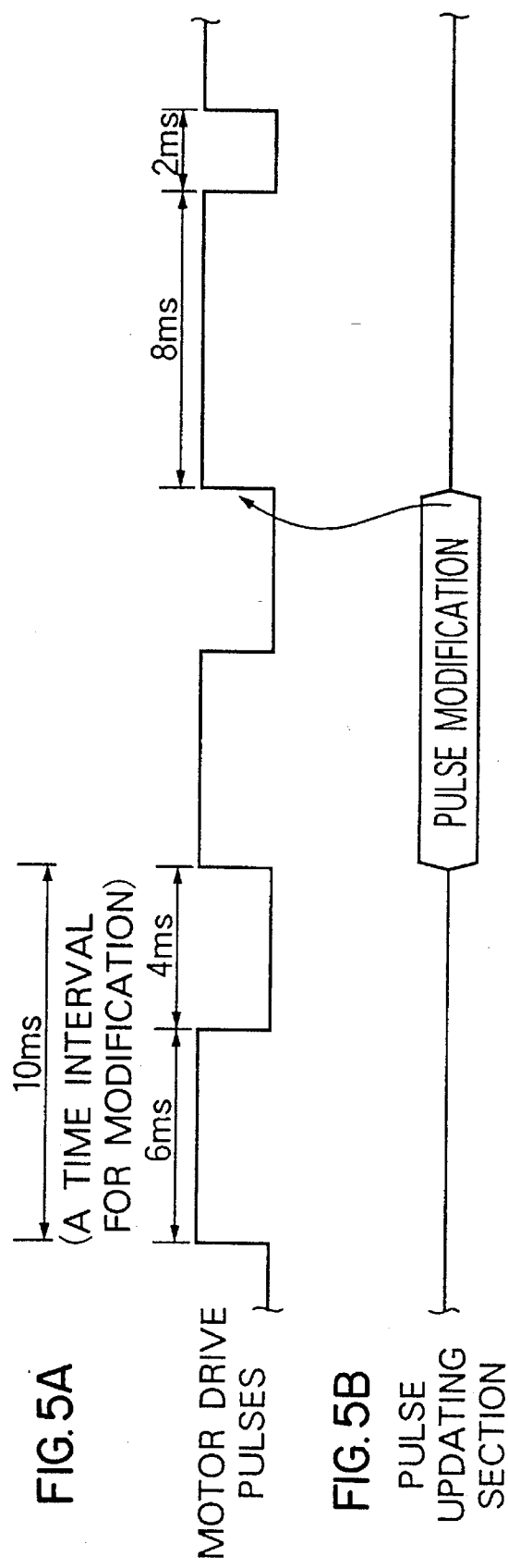

SERVO MOTOR

FIELD OF THE INVENTION

The present invention relates to a servo motor, and more particularly to a servo motor having its rotary speed controlled by a pulse width modulated (PWM) pulse wave.

DESCRIPTION OF BACKGROUND ART

Conventionally, speed control of a motor is accomplished by feeding back the current rotation angle θ of the motor for comparison with the rotation angle θref of the command value and multiplying the difference (θref-θ) by a suitable gain so as to vary the voltage for driving the motor. FIG. 1 is a block diagram of a conventional motor, wherein K1, K2 are gains, Tm=RJ/(RD+Kt·Ke), and Km=Kt/(RD+Kt·Ke), where R(Ω) is the resistance of the armature, J(Kgcm$^2$) is the inertia of the armature, Kt(Kgcm/A) is a torque constant, and Ke is a counter electromotive force constant. In a motor of this type each of the gains K1, K2 of the P-type controller is designated based on a comparison of the coefficients of the characteristic equation of the transfer function from the command value θref to the current value θ with those of a desired transfer function defined based on the pole selected for the desired response. The response time is varied in accordance with the gains K1, K2.

In this conventional servo motor, however, it is necessary to execute various calculations, especially multiplications, after the feedback of the current value θ and the calculation of the deviation from the command value θref. Accordingly, the system requires a control circuit of relatively large scale and size for executing the complex calculations. This makes the system large and costly.

SUMMARY OF THE INVENTION

It is therefore an object of the present invention to provide a servo motor which can accurately control the rotary speed of the motor using a simple and small circuit.

The above and other objects of the present invention can be accomplished by a servo motor comprising a motor, a motor drive means for outputting pulses for driving the motor to the motor, and a speed detecting means for calculating speed information, the servo motor further comprising a comparing means for comparing the speed information with command speed information and calculating deviation information therebetween, a memory means for storing pulse correction information for modifying the duty factor of the pulses in accordance with the rotation state of the motor, and a pulse updating means for reading the pulse correction information stored in the memory means, modifying the duty factor of the pulses, and outputting the duty factor modified pulses to the motor drive means.

In a preferred aspect of the present invention, the servo motor further comprises an information modifying means for modifying the pulse correction information stored in said memory means and/or the command speed information.

In another preferred aspect of the present invention, the speed detecting means comprises a pulse generating means for generating pulses corresponding to the rotation speed of the motor, a pulse counting means for counting the pulse number value per a predetermined time period, the predetermined time period being determined in accordance with the reference pulse information stored in the memory means.

In a further preferred aspect of the present invention, the reference pulse information includes sample period data corresponding to the predetermined time period.

In a still further preferred aspect of the present invention, the pulse updating means outputs the duty factor modified pulses at a timing in accordance with the reference pulse information.

In a further preferred aspect of the present invention, the reference pulse information includes interval data for use in outputting the duty factor modified pulses.

In a still further preferred aspect of the present invention, the speed information includes at least an on-duty period for exciting the motor, said pulse correction information includes values for modifying the on-duty period, and the pulse updating means is adapted to change the value of the on-duty period in accordance with one of the values.

In a further preferred aspect of the present invention, each of the values corresponds to the value to be added to or to be subtracted from said on-duty period.

In a still further preferred aspect of the invention, the comparing means is arranged to calculate the difference between the speed information and the command speed information and to select the value closest to the difference from among the values as the deviation information.

The above and other objects and features of the present invention will become apparent from the following description made with the reference to the accompanying drawings.

BRIEF DESCRIPTION OF THE DRAWINGS

FIGS. 3A and 3B are tables showing maps of the information stored in a table.

FIG. 4 is a timing chart showing the operation of a pulse counter.

FIG. 5 is a timing chart showing how motor drive pulses are modified when a pulse modified by a pulse updating section is generated.

DESCRIPTION OF THE PREFERRED EMBODIMENT

Figure 1:
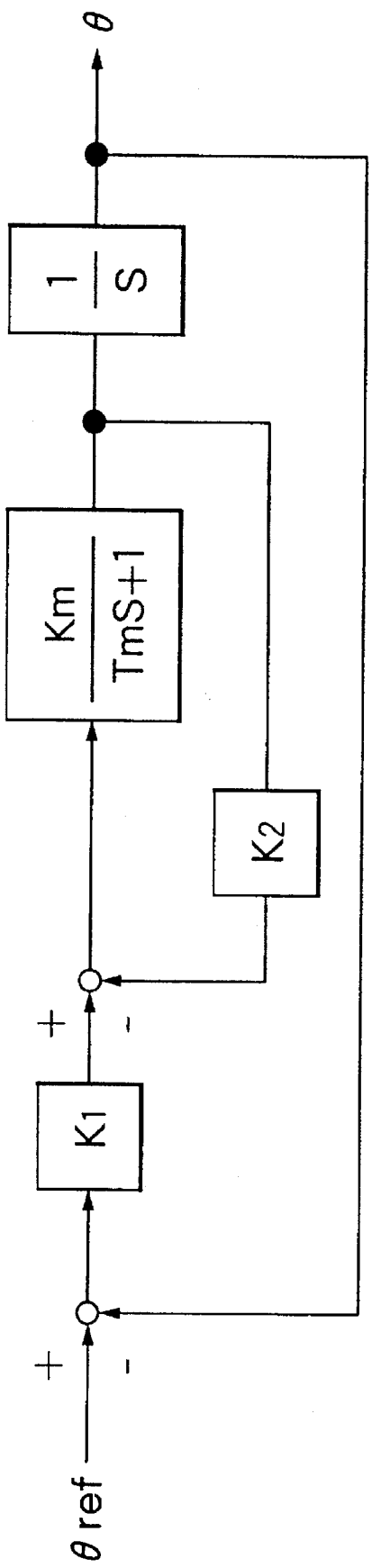
FIG. 1 is a schematic block diagram of a conventional servo motor.
Figure 2:
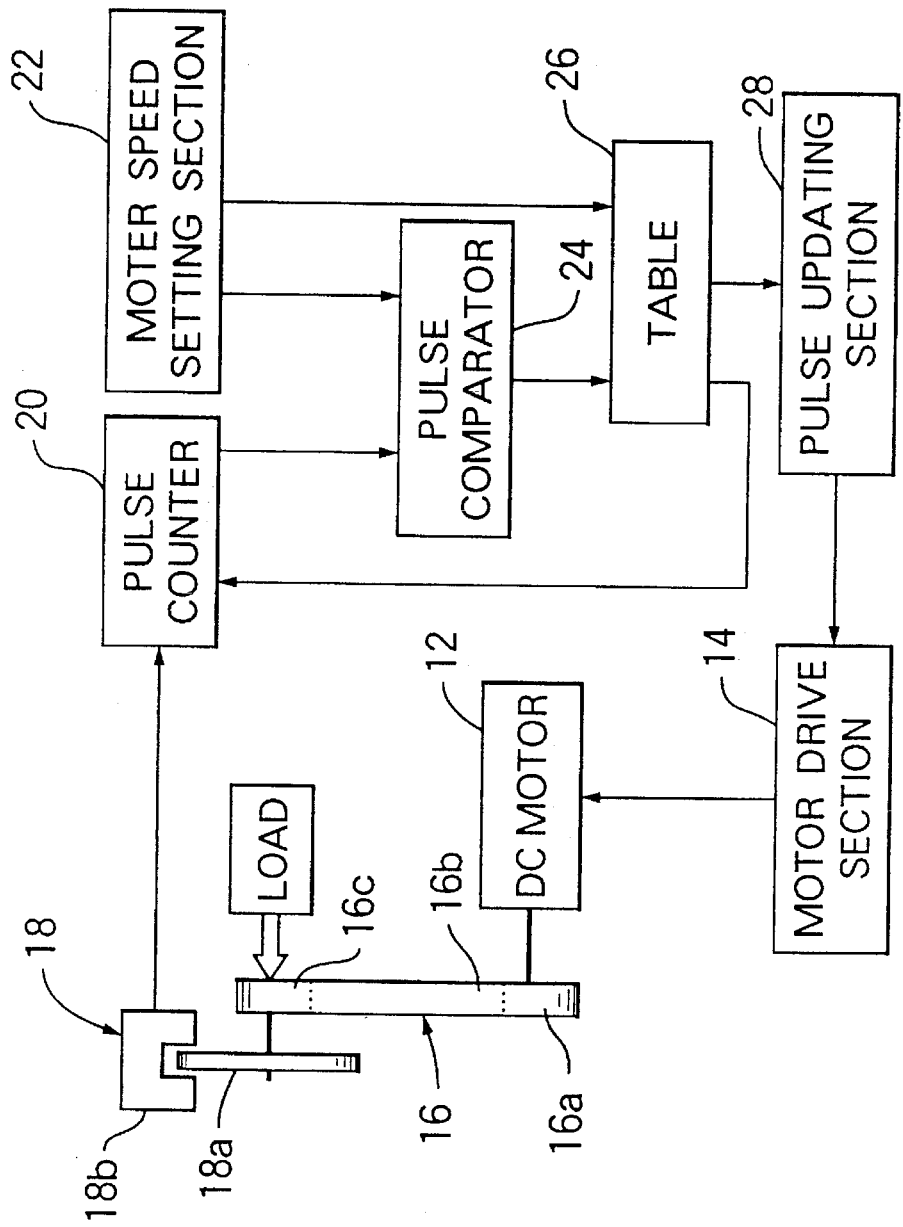
FIG. 2 is a schematic block diagram of a servo motor which is an embodiment of the present invention.

FIG. 2 shows a servo motor system including a servo motor which is an embodiment of the present invention. The servo motor is used to drive a drive force transmitting means such as an endless belt for conveying a bank note (not shown) in a money processing machine. The servo motor system comprises a brushless direct-current (DC) motor 12, a motor drive section 14 for providing a drive voltage to drive the DC motor 12, a drive force transmitting means 16 rotated by the DC motor 12 for conveying the bank note (not shown), a pulse generator 18 for generating pulses in accordance with the rotational speed of the DC motor 12, a pulse counter 20 for counting the number of pulses generated by the pulse generator 18 per a predetermined time period, a motor speed setting section 22 connected to an input device (not shown) for outputting speed information indicating the speed set by use of the input device and a pulse number value indicating the number of pulses per the predetermined time period corresponding to the speed, a pulse comparator 24 for comparing the pulse count output by the pulse counter 20 with the pulse number value output by the motor speed setting section 22 and generating deviation information, a table 26 for providing pulse duty factor information in accordance with the speed information from the motor speed setting section 22 and the deviation information from the pulse comparator 24, and a pulse updating section 28 for modifying motor drive pulses in accordance with the pulse duty factor information.

The brushless DC motor 12 is driven by a pulsed drive voltage output from the motor drive section 14 and is arranged to vary in rotational speed as the duty factor of the pulses varies.

The drive force transmitting means 16 comprises a pair of pulleys 16a, 16c and an endless belt 16b wound around the pulleys 16a, 16c. The pulley 16a is fixed to an output shaft of the DC motor 12 and is rotated by the rotation of the DC motor 12. The rotation of the pulley 16a is transmitted via the endless belt 16b to the pulley 16c to rotate it in the same direction as the pulley 16a. The bank note (not shown) inserted into the money processing machine is held between the endless belt 16b and the surface of a bank note passage (not shown) and is conveyed as the endless belt 16b moves.

The pulse generator 18 comprises a rotary encoder 18a constituted as a disc formed with a plurality of regularly spaced radial slits, a light emitting element (not shown), a light receiving element (not shown) and a pulse generating section 18b for generating pulses in response to the light receiving element receiving light from the light emitting element via the slits of the rotary encoder 18a. The rotary encoder 18a is fixed to a shaft of the pulley 16c to be rotated by the rotation of the pulley 16c. Consequently, the pulse generator 18 produces and sends to the pulse counter 20 pulses representing the rotational speed of the pulley 16c as a function of the distance between adjacent slits formed on the rotary encoder 18a.

The pulse counter 20 counts the number of pulses generated by the pulse generator 18 during each predetermined time period and outputs the pulse count to the pulse comparator 24. As explained later, the predetermined time period is defined by the table 26.

The motor speed setting section 22 is provided with a memory (not shown) which in advance stores speed information corresponding to the speed to be set using the input device (not shown) and the pulse number value corresponding to the speed. When the operator uses the input device (not shown) to set the desired speed, information indicative of the speed is delivered from the input device to the motor speed setting section 22. The motor speed setting section 22 reads from the memory (not shown) the speed information corresponding to the set speed and the pulse number value corresponding thereto and delivers the speed information to the table 26 and the pulse number value to the pulse comparator 24. In addition, if speed information indicative of a speed to be newly set and other information concerning the speed are input to the input device (not shown), the motor speed setting section 22 can store the information in a predetermined area of the memory (not shown). Further, the speed information indicative of the speed and the pulse number value corresponding to the speed can be updated using the input device (not shown). Updating of the speed information is described later.

The pulse comparator 24 compares the pulse count from the pulse counter 20 with the pulse number value from the motor speed setting section 22, calculates a difference value and generates deviation information. The deviation information corresponds to the deviation value between the pulse count obtained during the predetermined time period owing to the rotation of the DC motor 12 and the pulse number value corresponding to the set speed. In this embodiment, however, the table 26 stores for each set of speed information only 7 (seven) typical values such as −60, −20, −10, 0 (zero), +10, +20, and +60 as the deviation information. Accordingly, the pulse comparator 24 selects the value closest to the difference value from among the seven values and delivers the selected value as the deviation information to the table 26.

The table 26 is arranged to deliver pulse duty factor information to the pulse updating section 28 using the information from the pulse comparator 24 and the motor speed setting section 22 as address data. FIG. 3 shows maps of the information stored in the table. FIG. 3A is the map of correction information 200 for correcting the duty factor of the pulses in accordance with the set speed, and FIG. 3B is the map of reference pulse information 210 for the set speed. The pulse duty factor information is comprised of the correction information 200 and the reference pulse information 210.

The correction information 200 represents how much the on-duty period, namely, the time period during each cycle when the motor drive pulse is on ("1" state) and the off-duty period, namely the time period during each cycle when the motor drive pulse is off ("0" state) have to be modified in accordance with each set of deviation information for each set of speed information provided by the motor speed setting section 22. On the other hand, the reference pulse information 210 is a set of reference data concerning the pulses for rotating the DC motor 12 at the rotation speed corresponding to the speed information from the motor speed setting section 22, and includes, for each set of speed information, on-duty period data 212 indicative of the on-duty period of the pulse, off-duty period data 214 indicative of the off-duty period thereof, cycle period data 216 indicative of the cycle period thereof, sample period data 218 indicative of the sample period for obtaining the speed information, and interval data 220 indicative of the time interval between the modifications of the duty factor of the pulse. As shown in FIG. 3B, for example, if the speed information provided by the motor speed setting section 22 corresponds to the "set speed 1", the on-duty period of the pulse is "6"(ms), the off-duty period thereof is "4"(ms), the cycle period is "10"(ms), the sample period is "10"(ms), and the interval is "10"(ms). The table 26 stores the correction information 200 and the reference pulse information 210 for each of the set speeds from the "set speed 1" to the "set speed n". The above mentioned correction information 200 and the reference pulse information 210 for each set speed is determined experimentally and stored in the table 26 in advance. The sample data 218 of the reference pulse information 210 is delivered to the pulse counter 20, and the pulse counter 20 counts the number of pulses during time periods as indicated by the sample data 218.

The pulse updating section 28 receives the correction information 200 and the reference pulse information 210 from the table 26 and generates pulse information for modifying the on-duty period and the off-duty period based on the reference pulse information 210 by the periods indicated by the correction information 200, modifies the duty factor of the pulses for rotating the DC motor 12 at time intervals as indicated by the interval data 220 of the reference pulse information 210, and delivers the duty factor modified pulse to the motor drive section 14.

The operation of the thus constructed DC servo motor will now be explained.

First, the operator uses the input device (not shown) to set the desired speed and then enters a command to start the motor. When the motor speed setting section 22 receives the information from the input device (not shown), it reads from the memory (not shown) the pertinent set speed information and pulse number value indicating the number of pulses per the predetermined time period corresponding to the set speed and delivers the speed information to the table 26 and the pulse number value to the pulse comparator 24. Since the pulse counter 20 is initially set such that the pulse count output by the counter 20 coincides with the pulse number value output by the motor speed setting section 22 when the motor starts, the deviation information output from the pulse comparator 24 equals 0 (zero). Accordingly, the correction information 200 and the reference pulse information 210 corresponding to the deviation 0 (zero) for the desired set speed input by the operator are delivered to the pulse updating section 28.

For example, if the operator selects the "set speed 1" and starts the motor using the input device, the table 26 delivers to the pulse updating section 28 correction information 200 equal to "0 (zero)" and reference pulse information 210 including on-duty period data "6", off-duty period data "4", cycle period data "10", sample period data "10", and interval data "10".

The pulse updating section 28 outputs to the motor drive section 14 a pulse consisting of a level "1" period of a length corresponding to the on-duty period data from the table 26 and a subsequent level "0" period of a length corresponding to the off-duty period data from the table 26. The motor drive section 14 outputs to the DC motor 12 a drive voltage based on the pulse from the pulse updating section 28, whereby the DC motor starts.

As the DC motor rotates, the pulley 16a of the drive force transmitting means 16 fixed to the axis of the DC motor 12 is rotated to move the endless belt 16b, which in turn rotates the pulley 16c. If a bank note has been inserted into the money processing machine and is held between the endless belt 16b and the bank note passage (not shown), a load 40 acts on the endless belt 16b and causes the rotation speed of the pulleys 16a, 16c to change. As the pulley 16c is rotated, the rotary encoder 18a fixed to the pulley 16c is rotated and the pulse generator 18 outputs pulses corresponding to the rotation speed of the pulley 16c.

The pulse counter 20 counts the number of pulses generated by the pulse generator 18 during the predetermined time period and outputs the pulse count to the pulse comparator 24. As mentioned above, if the "set speed 1" is selected, for example, the sample period data "10" is applied to the pulse counter 20 by the table 26. FIG. 4 shows the operation of the pulse counter 20. As shown in FIG. 4, in the above mentioned case, the pulse counter 20 counts the number of pulses received from the pulse generator 18 during every 10 (ms) interval and outputs the pulse count to the pulse comparator 24.

The pulse comparator 28 calculates the difference between the pulse count received from the pulse counter 20 and the pulse number value received from the motor speed setting section 22. It then determines the deviation information based on the calculated difference. Assuming that "set speed 1" has been selected, if the pulse number value per the predetermined time period received from the motor speed setting section 22 is 120 whereas the pulse count received from the pulse counter 20 is 100 due to the effect of the load 40 acting on the drive force transmitting means 16, the difference is 100−120=−20. Consequently, in this case, the pulse comparator 24 delivers deviation information of "−20" to the table 26. On the other hand, if the pulse number value received from the motor speed setting section 22 is 120 whereas the pulse count received from the pulse counter 20 is 85, the difference becomes 85−120=−45. In this case, the pulse comparator 24 delivers to the table 26 deviation information of "−60" which is the closest deviation information value to the difference "−45".

Upon receiving the speed information from the motor speed setting section 22 and the deviation information from the pulse comparator 24 as address data, the table 26 outputs the corresponding correction information 200 and reference pulse information 210 to the pulse updating section 28. Again assuming that "setting speed 1" has been selected by the operator and the deviation information output by the pulse comparator 24 equals "−20", the table outputs correction information 200 of "+2", and reference pulse information 210 including on-duty period data "6", off-duty period data "4", cycle period data "10", sample data "10", and interval data "10".

The pulse updating section 28 modifies the duty factor of the pulse by increasing or decreasing the on-duty and off-duty periods in line with the on-duty period data and the off-duty period data of the reference pulse information 210. In the foregoing example assuming "set speed 1" and deviation information of "−20" from the pulse comparator 24 after the motor starts, the modified pulse includes an on-duty period equal to 6+2=8(ms) and an off-duty period equal to 4−(+2)=2(ms). FIG. 5 shows the modification of the motor drive pulse when a pulse modified by the pulse updating section 28 is generated. As shown in FIG. 5, when a motor drive pulse including an on-duty period of 6(ms) and an off-duty period of 4(ms) is to be modified into one having an on-duty period of 8 (ms) and an off-duty period of 2 (ms), the pulse updating section 28 refers to the interval data 220 from the table 26 and, in accordance therewith, outputs the modified pulse to the motor drive section 14. If the "set speed 1" is selected and the deviation information from the pulse comparator 24 is −60, the modified pulse is calculated to include an on-duty period of 6+5=11(ms) and an off-duty period of 4−(+5)=−1(ms). In this case, the pulse is made to include an on-duty period of 10(ms) and an off-duty period of 0(ms). Namely, if the on-duty or off-duty period of the calculated pulse is greater than the period of the motor drive pulse or less than 0 (zero), the larger one is made to coincide with the period of the motor drive pulse and the smaller one is made to coincide with 0 (zero).

The motor drive section 14 outputs the drive voltage to the DC motor 12 based on the modified pulse received from the pulse updating section 28 to change the rotation speed of the DC motor 12. In this manner, the DC motor 12, whose rotation speed tends to vary with the load 40, can be desirably controlled.

In addition, when it is necessary to set a new speed and speed information concerning the new speed, the operator uses the input device (not shown) to set on-duty period data indicative of the on-duty period of the pulse corresponding to the set speed, off-duty period data indicative of the off-duty period, cycle period data indicative of the cycle period of the pulse, sample period data indicative of the sample period for obtaining the speed information, the increase and decrease values of the pulse duty factor corresponding to each set of deviation information, and the pulse number value to be obtained during the sample period. The motor speed setting section 22 receives the above mentioned information from the input device (not shown) and stores the pulse number value in the predetermined area of the memory (not shown) and the on-duty period data, the off-duty period data, the cycle period data, the sample period data, the interval data, and the increase and decrease values corresponding to the deviation information in the predetermined areas of the table 26.

On the other hand, for updating the speed information concerning a particular speed, the operator uses the input device (not shown) to designate the information to be updated and the changes in the values thereof. The motor speed setting means 22 receives the information with changed values from the input device (not shown) and stores them in the predetermined area of the memory (not shown) and/or the table 26.

According to this embodiment, since the pulse count of the pulse counter is compared with the pulse number value from the motor speed setting section to determine the deviation information and the duty factor of the pulse is modified in accordance with the deviation information, it is possible to accurately control the rotary speed of the motor without complex calculations, especially multiplications.

The present invention has thus been shown and described with reference to specific embodiments. However, it should be noted that the present invention in no way limited to the details of the described arrangements but changes and modifications may be made without departing from the scope of the appended claims.

For example, although in the above described embodiment, 7 (seven) values such as −60, −20, −10, 0, +10, +20, and +60 are set as the deviation information for each set of speed information, the invention is not limited to this arrangement and it is instead possible to set values which differ by ten such as −60, −50, −40, . . . , 50, 60 or some other value. In addition, the upper and lower boundaries of the values can be set in accordance with the load, the characteristics of the motor, or the like.

Further, although in the above described embodiment the sample data period indicative of the sample period for obtaining the speed information coincides with the period of the motor drive pulse, the invention not limited to this arrangement. For example, if the set rotary speed of the motor is relatively small, it is preferable for the sampling period to be increased for obtaining a pulse count that is sufficiently large to ensure the accuracy of the speed control. On the contrary, if the set rotary speed of the motor is relatively large, the accuracy of the speed control can be sufficiently ensured even though the sample period is decreased. Furthermore, in the above described embodiment, the interval data indicative of the time interval for modifying the duty factor of the pulse is set to coincide with the period of the motor drive pulse. However, the invention is not limited to this arrangement, and it is instead possible to modify the duty factor of the motor drive pulse every so many samples of the speed information.

Moreover, although in the above described embodiment the servo motor is used to drive a drive force transmitting means such as an endless belt for conveying a bank note in a money processing machine, it is apparent that the servo motor of the present invention is not limited to this application.

Further, in the present invention, the respective means need not necessarily be physical means and arrangements whereby the function of the respective means is accomplished by software fall within the scope of the present invention. In addition, the function of a single means may be accomplished by two or more physical means and the functions of two or more means may be accomplished by a single physical means.

I claim:

1. A servo motor comprising a motor, a motor drive means for driving said motor by outputting pulses to said motor, and a speed detecting means for calculating speed information, said servo motor further comprising:

a comparing means for comparing said speed information with command speed information and calculating deviation information therebetween, a memory means for storing pulse correction information for modifying a duty factor of said pulses in accordance with a rotational state of said motor, and a pulse updating means for reading said pulse correction information stored in said memory means based on said deviation information, modifying the duty factor of said pulses, and outputting the duty factor modified pulses to said motor drive means.

2. A servo motor in accordance with claim 1, further comprising an information modifying means for modifying said pulse correction information stored in said memory means and/or said command speed information.

3. A servo motor in accordance with claim 1, wherein said speed detecting means comprises a pulse generating means for generating pulses corresponding to the rotational speed of said motor, a pulse counting means for counting a number of pulses per a predetermined time period, said predetermined time period being determined in accordance with the reference pulse information stored in said memory means.

4. A servo motor in accordance with claim 2, wherein said speed detecting means comprises a pulse generating means for generating pulses corresponding to the rotation speed of said motor, a pulse counting means for counting a number of pulses per a predetermined time period, said predetermined time period being determined in accordance with the reference pulse information stored in said memory means.

5. A servo motor in accordance with claim 3, wherein said reference pulse information includes sample period data corresponding to the predetermined time period.

6. A servo motor in accordance with claim 4, wherein said reference pulse information includes sample period data corresponding to the predetermined time period.

7. A servo motor in accordance with claim 1, wherein said pulse updating means outputs the duty factor modified pulses at a timing in accordance with said reference pulse information.

8. A servo motor in accordance with claim 7, wherein said reference pulse information includes interval data for use in outputting the duty factor modified pulses.

9. A servo motor in accordance with claim 1, wherein said speed information includes at least an on-duty period for exciting said motor, wherein said pulse correction information includes values for modifying said on-duty period, and wherein said pulse updating means changes the value of said on-duty period in accordance with one of said values.

10. A servo motor in accordance with claim 9, wherein each of said values corresponds to the value to be added to or to be subtracted from said on-duty period.

11. A servo motor in accordance with claim 10, wherein said comparing means calculates the difference between said speed information and said command speed information and selects the value closest to the difference from among said values as said deviation information.

\* \* \* \* \*